A. W. STOUDER.
FLY TRAP.
APPLICATION FILED MAR. 11, 1911.
1,011,389.
Patented Dec. 12, 1911.
2 SHEETS—SHEET 1.
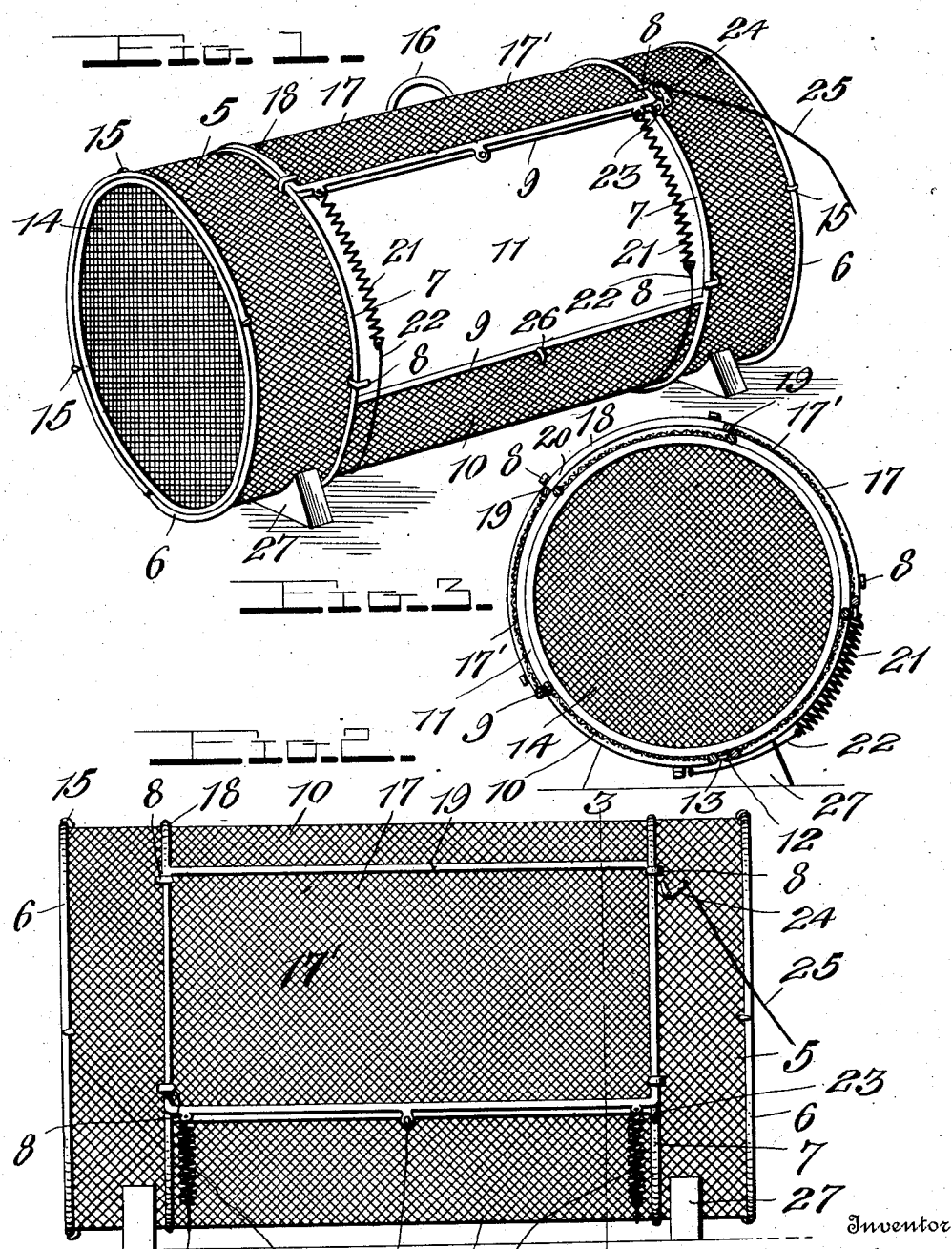
Witnesses
Chas. L. Griesbauer.
A. F. Garvey.
Inventor
A. W. Stouder;
By Watson E. Coleman.
Attorney
COLUMBIA PLANOGRAPH CO., WASHINGTON, D. C.

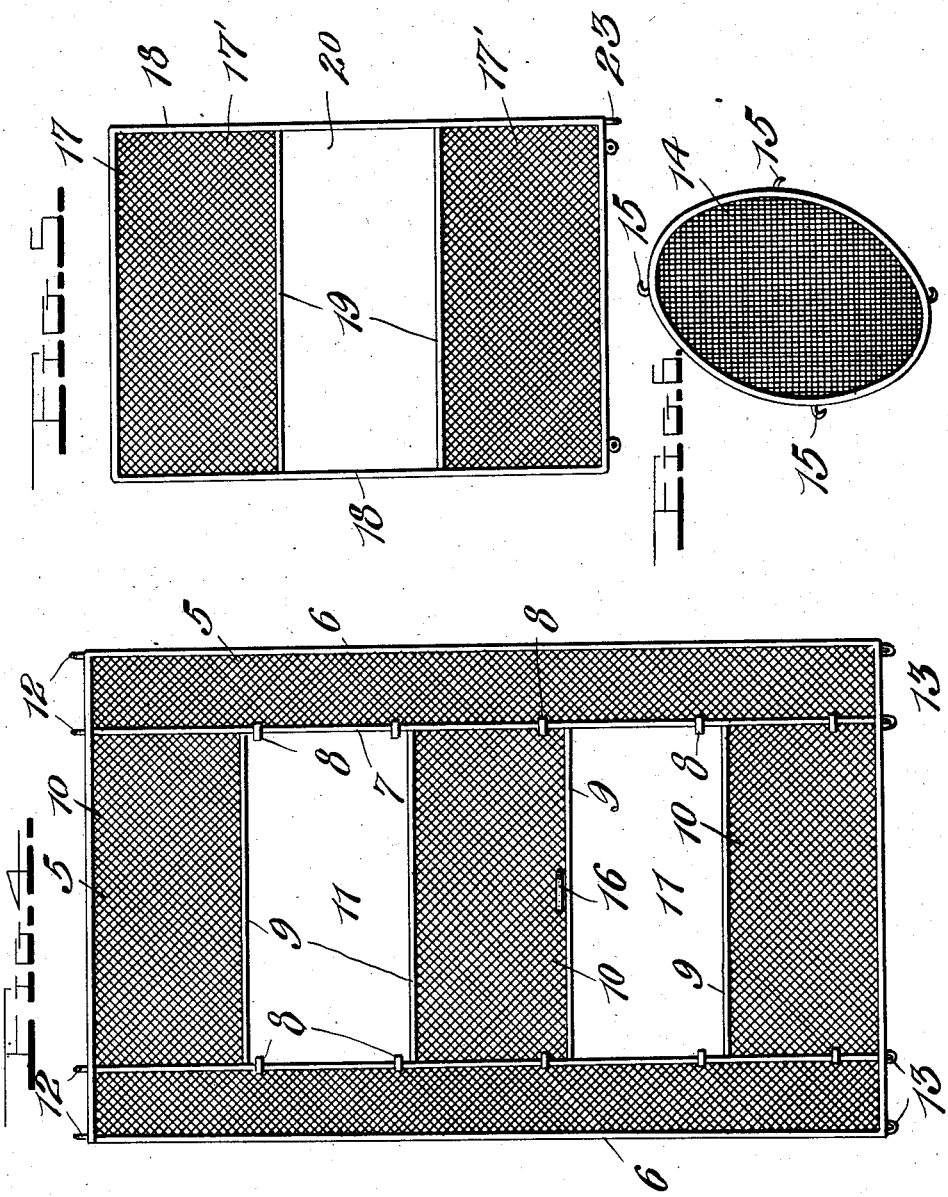

UNITED STATES PATENT OFFICE.

ALBERT W. STOUDER, OF EMPORIA, KANSAS.

FLY-TRAP.

1,011,389.　　　　Specification of Letters Patent.　　Patented Dec. 12, 1911.

Application filed March 11, 1911. Serial No. 613,727.

*To all whom it may concern:*

Be it known that I, ALBERT W. STOUDER, a citizen of the United States, residing at Emporia, in the county of Lyon and State of Kansas, have invented certain new and useful Improvements in Fly-Traps, of which the following is a specification, reference being had to the accompanying drawings.

This invention relates to an improved fly trap and more particularly to a fly trap of such construction as to facilitate packing and transportation of the same so that it will occupy but little space.

A further object of my invention resides in the provision of a trap of the above character formed from wire netting and adapted to assume a cylindrical form when set up in the position for use.

A still further object is to provide a cylindrical trap having openings to admit the flies to the interior thereof, and a door arranged thereon movable over said openings to open and close the same, and means for instantly closing the doors upon the release of a suitable holding trip.

With these and other objects in view, the invention consists of the novel features of construction, combination and arrangement of parts hereinafter fully described and claimed, and illustrated in the accompanying drawings, in which—

Figure 1 is a perspective view of my improved fly trap showing the same opened; Fig. 2 is a side elevation, the trap being closed; Fig. 3 is a section taken on the line 3—3 of Fig. 2; Fig. 4 is a plan view of the body of the trap before the same is set up; Fig. 5 is a similar view of the door; and Fig. 6 is a detail perspective view of one of the ends of the trap.

Referring more particularly to the drawings 5 indicates the body of my improved trap which is preferably formed of wire netting of the proper gage for the particular purpose to which the trap is to be put. This wire netting is secured to a flexible wire 6 which forms the edges of the trap body. Longitudinal wires 7 are disposed in spaced parallel relation to the longitudinal edge wire 6 and carry a plurality of eyes 8 for a purpose which will be more fully hereinafter described. A plurality of spaced parallel transverse wires 9 connect the wires 7. Wire netting 10 is secured between the intermediate wires 9 while the space defined by the end wires 9 and the adjacent wires is left open as shown at 11. To one of the end edge wires 6 a plurality of hooks 12 are secured while to the corresponding wire at the other end of the trap body a plurality of eyes 13 are secured. When the trap is to be set up into position for use the hooks 12 are engaged with the eyes 13 so that a cylindrical body is formed as shown in Fig. 1. The end members 14 are adapted to be disposed upon the ends of this cylindrical body to close the same. Each of these end members consists of a ring or wire to which the netting is secured. This wire also carries a plurality of hooks 15 which are adapted to engage over the edge wires 6 of the body 5. The trap is thus securely closed at both ends and to the netting 10 between the openings 11 in the body a suitable handle 16 is secured, by means of which the device may be readily moved from place to place.

In order to effect the instantaneous closure of the openings 11 after the flies have entered the body of the trap, I provide the door 17 which as shown in Fig. 5 comprises a rectangular wire frame 18 to the longitudinal edges of which the intermediate wires 19 are secured. The space between these wires is open as shown at 20 and is adapted to register with one of the openings 11 in the body of the trap when the same is set. The longitudinal wires 18 of the frame are disposed through the eyes 8 and secured to the wires 7 and the body of the trap, whereby the door is guided in its movement to open and close the openings 11.

To one end of the door the coiled springs 21 are connected, said springs being formed on the end of a flexible wire 22 which extends circumferentially around a portion of the trap body and is secured to the wire mesh which forms the same. To the frame 17 adjacent to the opening 20 of the door an eye 23 is secured. A trip 24 is pivoted on the trap body and is adapted to engage in said eye to hold the door open, or in other words, to retain the open portion 20 thereof in register with one of the openings 11 in the body. When the door has been moved to this position the springs 21 are placed under tension. An operating string or cord 25 is secured to the trip and is adapted to actuate the same to release the door whereupon the springs 21 will contract and move the wire mesh portions 17′ thereof over the openings 11 in the trap body to close the same and prevent the escape of the flies which have accumulated within the interior of the trap. A spring catch 26 is secured to the body of the trap adjacent to the edge of one of the openings 11 and engages with a latch carried by the door to hold the same in locked position. Thus all danger of the door being accidentally opened when the trap is being moved to dispose of the flies which have been caught is avoided.

It will be understood of course that a suitable bait is placed within the trap body so as to attract the flies which enter the openings 11 from either side thereof. As soon as a sufficient number have congregated the operator gives the string 25 a sharp pull which releases the door so that it is instantly returned to its normal closed position. When closed the open portion 20 of the door is arranged over the screen 10 between the intermediate rods 9 while the screened portions 17' of the door are arranged over the openings 11 of the trap body.

From the foregoing it will be seen that I have produced an extremely novel and efficient trap which is admirably adapted for the purpose set forth. It will be found particularly desirable in grocery stores, drug stores and upon the dining tables of cafes where flies accumulate very rapidly in the summer months.

As shown in Fig. 1 the trap when properly assembled may be arranged upon suitable end supports 27 so as to dispose the same above the table cloth to prevent the cloth being soiled by the wire screen.

Owing to the peculiar construction of my improved trap, the same may be packed and shipped in very large numbers without occupying much space in transportation. They may be nested in rectangular form as shown in Figs. 4 and 5, the end members being either arranged between the successive body portions or packed separately.

It requires but a few minutes to set the trap up into position for use and it may therefore be very thoroughly cleansed when necessary without requiring unnecessary work.

The device is also very strong and durable in construction and it is obvious that the same may be manufactured at an extremely low cost.

While I have shown and described the preferred embodiment of my invention, it will be understood that the same may be variously modified in the construction and arrangement of the parts without departing from the essential feature or sacrificing any of the advantages thereof.

Having thus described the invention what is claimed is:—

1. A trap of the character described comprising a rectangular reticulated body portion having hooks on one end and eyes on the other, said ends adapted to be connected to form a cylindrical body, end closures for said body, longitudinal rods secured to the ends of said body and carrying spaced eyes, transverse rods between said last named rods, the space between the end transverse rods and the adjacent rods being open, a door comprising a frame having reticulated end portions and a central open portion, said frame being movable in the eyes on said rods, a spring secured to said body and to the door normally holding said door in closed position over the openings in the body, a trip secured to the body adapted to engage said door to hold it in open position, means for releasing said trip, and a catch adapted to engage said door to secure the same when closed.

2. A trap of the character described comprising a rectangular reticulated body, means for connecting the ends of said body to convert the same into a cylinder, end closures adapted to be detachably secured to the ends of the cylinder to close the same, said body having spaced openings therein, a door normally closing said openings, guide means arranged on the body for movably supporting the door, a coil spring secured at one end to the door adjacent to each end, said spring being formed on the end of a length of wire secured at its end to the body, an eye carried by the door, a trip secured to the body engaging with said eye to hold the door in open position, an operating cord attached to said trip to release the same to permit the springs to return the door to its closed position, and a catch for securing the door when closed.

In testimony whereof I hereunto affix my signature in the presence of two witnesses.

ALBERT W. STOUDER.

Witnesses:
JOHN FOWLER,
FRANK HOSTUTTER.

---

Copies of this patent may be obtained for five cents each, by addressing the "Commissioner of Patents Washington, D. C."